United States Patent
Landais et al.

(10) Patent No.: US 12,484,112 B2
(45) Date of Patent: Nov. 25, 2025

(54) RESTORATION OF MULTICAST/BROADCAST SERVICE UPON MULTICAST/BROADCAST FAILURE WITH RESTART

(71) Applicant: NOKIA TECHNOLOGIES OY, Espoo (FI)

(72) Inventors: Bruno Landais, Pleumeur-Bodou (FR); Horst Thomas Belling, Erding (DE); Philippe Godin, Versailles (FR); David Navrátil, Helsinki (FI)

(73) Assignee: Nokia Technologies Oy, Espoo (FI)

(*) Notice: Subject to any disclaimer, the term of this patent is extended or adjusted under 35 U.S.C. 154(b) by 356 days.

(21) Appl. No.: 18/107,771

(22) Filed: Feb. 9, 2023

(65) Prior Publication Data
US 2023/0254938 A1      Aug. 10, 2023

Related U.S. Application Data

(60) Provisional application No. 63/308,372, filed on Feb. 9, 2022.

(51) Int. Cl.
  *H04W 76/40*  (2018.01)
  *H04L 45/16*  (2022.01)
(52) U.S. Cl.
  CPC ............ *H04W 76/40* (2018.02); *H04L 45/16* (2013.01)
(58) Field of Classification Search
  CPC .... H04W 76/12; H04W 76/40; H04L 12/189; H04L 45/16
  See application file for complete search history.

(56) References Cited

U.S. PATENT DOCUMENTS

2017/0332431 A1   11/2017   Kim et al.
2020/0170071 A1   5/2020    Mildh et al.
(Continued)

FOREIGN PATENT DOCUMENTS

CN   112740820 A   4/2021
CN   113271553 A   8/2021
(Continued)

OTHER PUBLICATIONS

3GPP TS 23.247 V17.1.0 (Dec. 2021), Technical Specification, 3rd Generation Partnership Project; Technical Specification Group Services and System Aspects; Architectural enhancements for 5G multicast-broadcast services; Stage 2 (Release 17), Dec. 2021.
(Continued)

*Primary Examiner* — Kenny S Lin
(74) *Attorney, Agent, or Firm* — Nokia Technologies Oy

(57) ABSTRACT

Systems, methods, apparatuses, and computer program products for restoration of multicast/broadcast service upon multicast/broadcast failure with restart are provided. For example, a method may include detecting a restart of a multicast/broadcast user plane function that was supporting a packet forwarding control protocol session for a multicast/broadcast session. The method may also include re-creating a packet forwarding control protocol session for the multicast/broadcast session. The method may further include providing addressing information for the data delivery of the broadcast/multicast session to the multicast/broadcast user plane function and instructing the multicast/broadcast user plane function to use this addressing information for the broadcast/multicast session if possible.

18 Claims, 5 Drawing Sheets

(56) References Cited

U.S. PATENT DOCUMENTS

| | | | |
|---|---|---|---|
| 2020/0245163 A1* | 7/2020 | Jaya | H04L 47/2475 |
| 2020/0252990 A1 | 8/2020 | Ganesan et al. | |
| 2022/0015063 A1 | 1/2022 | Byun et al. | |
| 2022/0046729 A1* | 2/2022 | Jeong | H04W 76/10 |
| 2022/0287136 A1* | 9/2022 | Wei | H04W 76/20 |
| 2022/0345532 A1* | 10/2022 | Chandramouli | H04L 67/146 |
| 2022/0377826 A1* | 11/2022 | He | H04W 76/12 |

FOREIGN PATENT DOCUMENTS

| | | | | |
|---|---|---|---|---|
| CN | 114143905 A | * | 3/2022 | |
| EP | 4184959 A1 | * | 5/2023 | H04L 12/1881 |
| WO | 2016062354 A1 | | 4/2016 | |
| WO | 2021/098123 A1 | | 5/2021 | |
| WO | 2021083645 A1 | | 5/2021 | |
| WO | 2021/138558 A1 | | 7/2021 | |

OTHER PUBLICATIONS

3GPP TS 23.501 V17.3.0 (Dec. 2021), Technical Specification, 3rd Generation Partnership Project; Technical Specification Group Services and System Aspects; System architecture for the 5G System (5GS); Stage 2 (Release 17), Dec. 2021.

3GPP TS 23.527 V17.2.0 (Dec. 2021), Technical Specification, 3rd Generation Partnership Project; Technical Specification Group Core Network and Terminals; 5G System; Restoration Procedures (Release 17), Dec. 2021.

3GPP TS 29.244 V17.3.0 (Dec. 2021), Technical Specification, 3rd Generation Partnership Project; Technical Specification Group Core Network and Terminals; Interface between the Control Plane and the User Plane Nodes; Stage 3 (Release 17), Dec. 2021.

3GPP TS 29.281 V17.1.0 (Sep. 2021), Technical Specification, 3rd Generation Partnership Project; Technical Specification Group Core Network and Terminals; General Packet Radio System (GPRS) Tunnelling Protocol User Plane (GTPv1-U) (Release 17), Sep. 2021.

Ericsson, "Discussion on Restoration of an MBS session in 5GS," C4-220165, 3GPP TSG-CT WG4 Meeting #107-bis-e, E-Meeting, Jan. 17-21, 2022.

Communication pursuant to Rule 69 EPC dated Nov. 7, 2023, corresponding to European Patent Application No. 23155830.5.

Partial European Search Report dated Jun. 27, 2023, corresponding to European Patent Application No. 23155830.5.

Extended European Search Report dated Sep. 28, 2023, corresponding to European Patent Application No. 23155830.5.

Office action received for corresponding Chinese Patent Application No. 202310091342.8, dated May 30, 2025, 9 pages of office action and 12 pages of translation available.

Communication under Rule 71(3) EPC dated Apr. 25, 2025 corresponding to European Patent Application No. 23155830.5.

\* cited by examiner

RESTORATION OF MULTICAST/BROADCAST SERVICE UPON MULTICAST/BROADCAST FAILURE WITH RESTART

CROSS REFERENCE TO RELATED APPLICATION:

This application claims the benefit of U.S. Provisional Application No. 63/308,372, filed Feb. 9, 2022. The entire content of the above-referenced application is hereby incorporated by reference.

FIELD

Some example embodiments may generally relate to communications including mobile or wireless telecommunication systems, such as Long Term Evolution (LTE) or fifth generation (5G) radio access technology or new radio (NR) access technology or 5G beyond, or other communications systems. For example, certain example embodiments may generally relate to systems and/or methods for providing restoration of multicast/broadcast service upon multicast/broadcast failure with restart.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus. The apparatus can include at least one processor and at least one memory comprising computer program code. The at least one memory and computer program code can be configured, with the at least one processor, to cause the apparatus at least to perform detecting a restart of a multicast/broadcast user plane function that was supporting a packet forwarding control protocol session for a multicast/broadcast session. The at least one memory and computer program code can also be configured, with the at least one processor, to cause the apparatus at least to perform re-creating a packet forwarding control protocol session for the multicast/broadcast session. The at least one memory and computer program code can further be configured, with the at least one processor, to cause the apparatus at least to perform providing addressing information for the data delivery of the broadcast/multicast session to the multicast/broadcast user plane function and instructing the multicast/broadcast user plane function to use this addressing information for the broadcast/multicast session if possible.

An embodiment may be directed to an apparatus. The apparatus can include at least one processor and at least one memory comprising computer program code. The at least one memory and computer program code can be configured, with the at least one processor, to cause the apparatus at least to perform receiving a request from a multicast/broadcast session management function for establishing a packet forwarding control protocol session for a multicast/broadcast session. The at least one memory and computer program code can also be configured, with the at least one processor, to cause the apparatus at least to perform receiving addressing information comprising addresses in the address range of the apparatus for the data delivery of the broadcast/multicast session. The at least one memory and computer program code can further be configured, with the at least one processor, to cause the apparatus at least to perform using this addressing information for the broadcast/multicast session if possible.

An embodiment may be directed to a method. The method may include detecting a restart of a multicast/broadcast user plane function that was supporting a packet forwarding control protocol session for a multicast/broadcast session. The method may also include re-creating a packet forwarding control protocol session for the multicast/broadcast session. The method may further include providing addressing information for the data delivery of the broadcast/multicast session to the multicast/broadcast user plane function and instructing the multicast/broadcast user plane function to use this addressing information for the broadcast/multicast session if possible.

An embodiment may be directed to a method. The method may include receiving a request from a multicast/broadcast session management function for establishing a packet forwarding control protocol session for a multicast/broadcast session. The method may also include receiving addressing information comprising addresses in the address range of the apparatus for the data delivery of the broadcast/multicast session. The method may further include using this addressing information for the broadcast/multicast session if possible.

An embodiment may be directed to an apparatus. The apparatus may include means for detecting a restart of a multicast/broadcast user plane function that was supporting a packet forwarding control protocol session for a multicast/broadcast session. The apparatus may also include means for re-creating a packet forwarding control protocol session for the multicast/broadcast session. The apparatus may further include means for providing addressing information for the data delivery of the broadcast/multicast session to the multicast/broadcast user plane function and instructing the multicast/broadcast user plane function to use this addressing information for the broadcast/multicast session if possible.

An embodiment may be directed to an apparatus. The apparatus may include means for receiving a request from a multicast/broadcast session management function for establishing a packet forwarding control protocol session for a multicast/broadcast session. The apparatus may also include means for receiving addressing information comprising addresses in the address range of the apparatus for the data delivery of the broadcast/multicast session. The apparatus may further include means for using this addressing information for the broadcast/multicast session if possible.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing broadcast service restoration for multicast/broadcast service (MBS) upon radio access node failure or restart, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Figure 1:
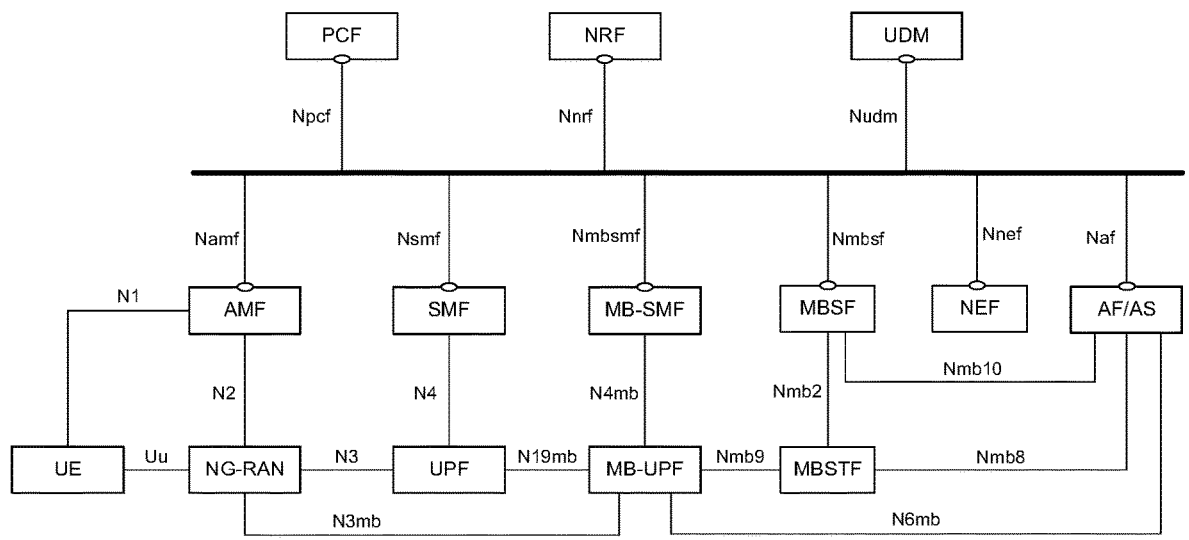
FIG. 1 illustrates a system architecture.

Release 17 (Rel-17) of the Third Generation Partnership Project (3GPP), describes architectural enhancements for fifth generation (5G) multicast and broadcast services. For example, 3GPP technical specification (TS) 23.247 describes a system architecture. FIG. 1 illustrates a system architecture that is based on FIG. 5.1-1 of TS 23.247, which is entitled "5G System architecture for Multicast and Broadcast Service."

As shown in FIG. 1, N4mb and N4 are the reference points used respectively between the between the session management function (SMF) and the user plane function (UPF) and between the multicast/broadcast (MB) SMF (MB-SMF) and the MB-UPF. Packet forwarding control protocol (PFCP) can be the protocol used over N4mb and N4. PFCP is specified in 3GPP TS 29.244.

An MB services (MBS) session may correspond to a broadcast MBS session, in which case the SMF and UPF may not be involved in the delivery of the service. An MBS session may alternatively correspond to a multicast MBS session, in which case the SMF and UPF can be involved in the delivery of MBS data, as explained in more detail in 3GPP TS 23.247.

For both broadcast and multicast MBS sessions, unicast transport or multicast transport can be used on N3mb, which may be applicable to broadcast and multicast MBS sessions, and can also be used on N19mb, which may be applicable to multicast MBS sessions only. Unicast transport can send packets in a general packet radio service (GPRS) tunneling protocol (GTP) user plane (GTP-U) tunnel as described in 3GPP TS 29.281. Packets can be sent to a downlink (DL) fully qualified tunnel endpoint identifier (F-TEID), which may include an internet protocol (IP) address and a tunnel endpoint identifier (TEID). Multicast transport can send packets using a low-layer source-specific multicast (LL SSM) address and common GTP TEID (C-TEID). An LL SSM address can include a multicast address, which can be used as destination address in packets sent, and the LL SSM address can also include a source IP address, which can correspond to an IP address of the MB-UPF. 3GPP TS 29.281 includes further discussion regarding IP multicast distribution of user plane data for MBMS and MBS.

MBS service restoration can refer end to end procedures to restore an MBS session when a failure with or without restart affects any entity involved in the delivery of the MBS session. The entities that may be affected can include, for example, MB-SMF, SMF, access and mobility management function (AMF), MB-UPF, UPF, and radio access network (RAN). In FIG. 1, the RAN element shown is a next generation (NG) RAN (NG-RAN) connected to a user equipment (UE) over a Uu interface.

The MB-SMF may store identities of AMFs handling a multicast or broadcast session. The AMF may be aware of RAN nodes involved in a multicast or broadcast MBS session and may store their identities.

When a failure with or without restart affects an MB-UPF, without certain embodiments all the PFCP sessions and contexts created in the MB-UPF for MBS sessions may be lost. Moreover, without certain embodiments MBS data may be undeliverable to the end users.

Moreover, without certain embodiments, if an NG-RAN node is reconfigured with a new tracking area identifier (TAI) that is part of an MBS service area of an existing MBS session, there may be no way to start the broadcast of an existing broadcast MBS session in the RAN node.

At 210, the MB-SMF can detect an MB-UPF restart. Upon detecting an MB-UPF restart, at 215 the MB-SMF can re-create the PFCP sessions for the affected MBS sessions in the MB-UPF, by applying any suitable approaches, such as the approaches for establishing a N4mb PFCP session for MBS as defined in clause 5.34.2 of 3GPP TS 29.244, but with at least some differences, as described below.

When multicast transport is used on N3mb and/or N19mb, at 220 the MB-SMF can newly provide the LL SSM and GTP-U C-TEID that was used prior to the MB-UPF restart to the MB-UPF and can instruct the MB-UPF to allocate this address and C-TEID, if possible. The MB-UPF response at 230 can indicate the LL SSM and GTP-U C-TEID that the MB-UPF allocated. The MB-UPF may provide back a different address only if the previous address cannot be reused, for example if the reset was a partial restart.

When unicast transport is used over N6mb/Nmb9, at 225 the MB-SMF can newly provide the N6mb/Nmb9 unicast tunnel address that was used prior to the MB-UPF restart and can instruct the MB-UPF to allocate this address, if possible. The MB-UPF response at 230 can indicate the N6mb/Nmb9 address that the MB-UPF allocated. The MB-UPF may provide back a different address only if the previous address cannot be reused, for example because of a partial restart.

If multicast transport is used for N6mb or N9mb, the MB-UPF can join delivery from the multicast address received in the request from the MB-SMF.

After an MB-UPF restart, N3mb/N19mb and N6mb/Nmb9 addresses may not be immediately reused by the MB-UPF after an MB-UPF restart, in order to avoid inconsistent addresses allocation throughout the network and to enable the restoration of packet forwarding control protocol (PFCP) sessions of the MBS sessions affected by the failure. How this is done may be implementation specific.

Certain embodiments can support all scenarios where the addressing information for MBS data delivery can be preserved/restored in the MB-UPF.

At 240, the method can include receiving a new unicast ingress tunnel address in the response from the multicast/broadcast user plane function. The method can also include, at 250, redirecting the multicast/broadcast service session towards the new unicast ingress tunnel address. The response that includes the new address can be the response received at 230.

At 245, the method can include receiving a new low-layer source-specific multicast address and common general packet radio service tunneling protocol user plane tunneling endpoint identifier in the response from the multicast/broadcast user plane function. The method can also include, at 255, providing the new low-layer source-specific multicast address and common general packet radio service tunneling protocol user plane tunneling endpoint identifier assigned by the multicast/broadcast user plane function to each access side destination. The response that includes the new address can be the response received at 230.

Figure 2:
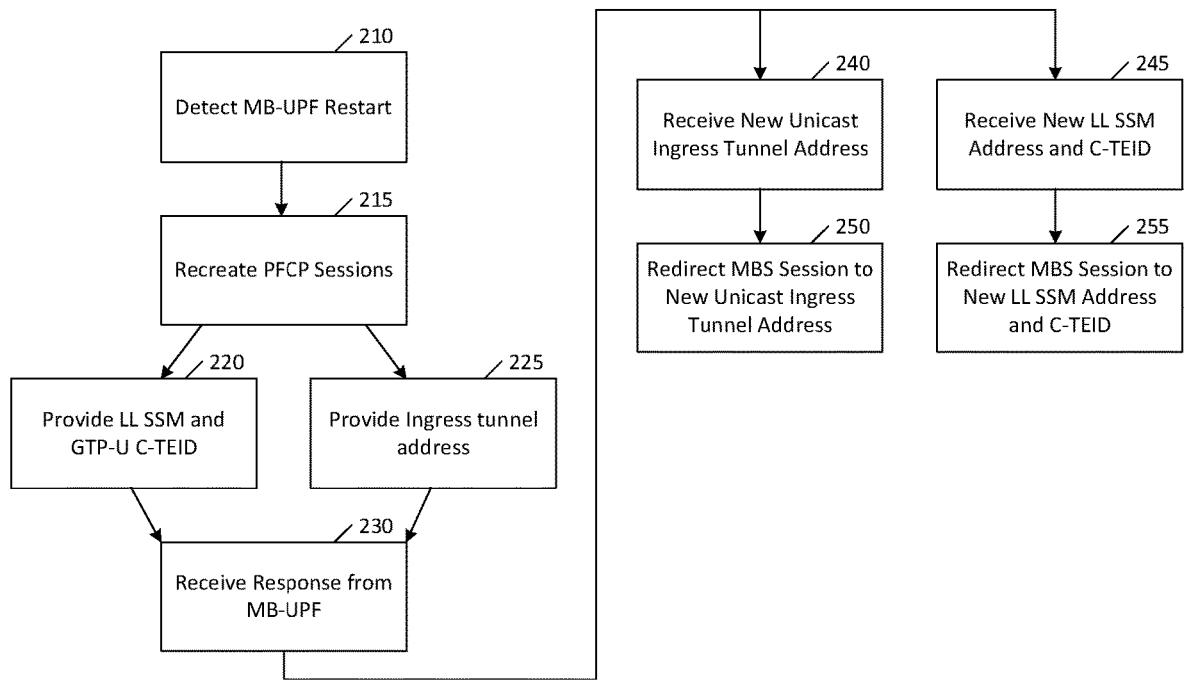
FIG. 2 illustrates a method according to certain embodiments.

FIG. 2 is provided as one example embodiment of a method or process. However, certain embodiments are not limited to this example, and further examples are possible as discussed elsewhere herein.

Figure 3:
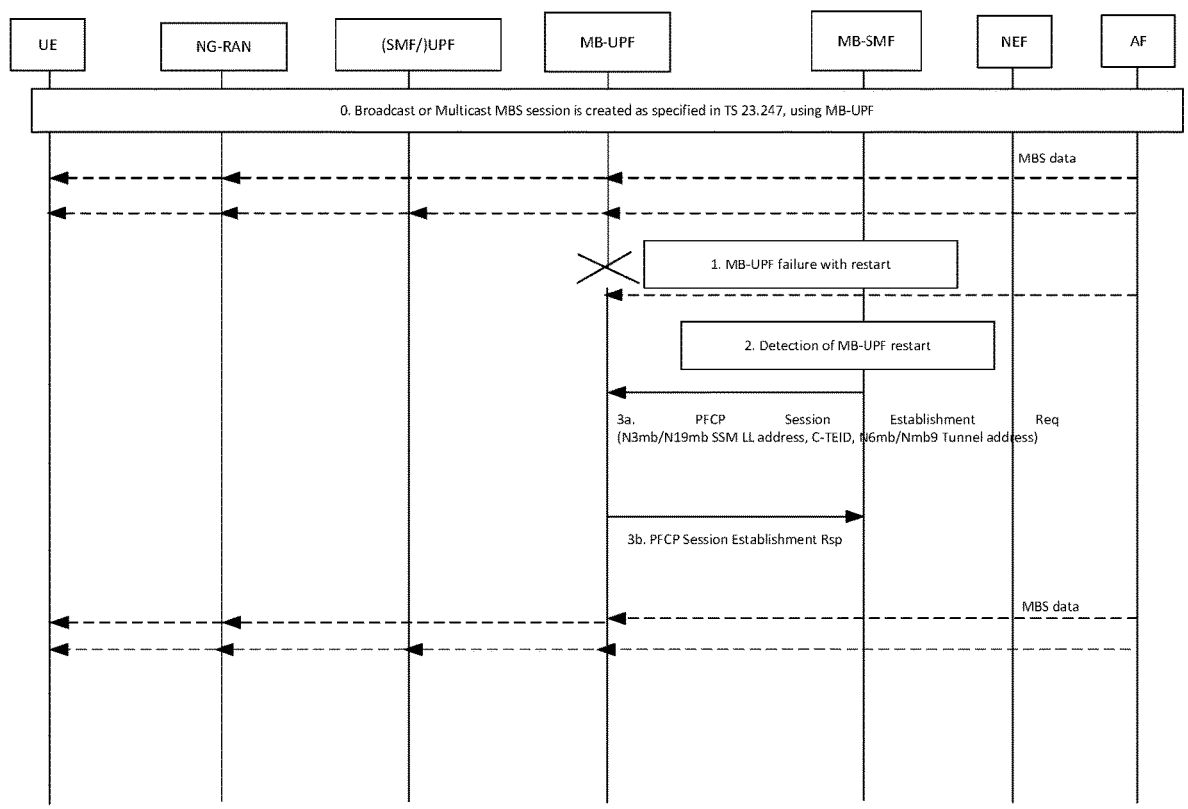
FIG. 3 illustrates a signal flow diagram of a method to restore a packet forwarding control protocol session for a multicast/broadcast service session in a restarted multicast/broadcast user plane function, according to certain embodiments.

FIG. 3 illustrates a signal flow diagram of a method to restore a packet forwarding control protocol session for a multicast/broadcast service session in a restarted multicast/broadcast user plane function, according to certain embodiments.

As shown in FIG. 3, at 0 a broadcast or multicast MBS session can be created, as described in 3GPP TS 23.247, using MB-UPF. MBS data may accordingly be distributed.

At 1, the MB-UPF may fail and restart. MBS data is no longer forwarded/distributed by the MB-UPF. At 2, the MB-SMF may detect the restart of the MB-UPF, using any desired mechanism, such as recovery of timestamp signaled in PFCP signaling.

At 3a, the MB-SMF may re-establish the PFCP session for MBS session in the MB-UPF, by applying any desired technique for establishing a N4mb PFCP session for MBS, such as the approach set forth in clause 5.34.2 of 3GPP TS 29.244, but with the following differences.

When multicast transport is used on N3mb and/or N19mb, at 3a the MB-SMF may newly provide the LL SSM and GTP-U C-TEID that was used prior to the MB-UPF restart to the MB-UPF and may instruct the MB-UPF to allocate this address and C-TEID, if possible. The MB-UPF response at 3b may indicates the LL SSM and GTP-U C-TEID the MB-UPF allocated. The MB-UPF may provide back a different address only if the previous address cannot be reused, for example in the case of a partial restart. If a different address is allocated, the MB-SMF can proceed as in the case of an MB-UPF failure without restart.

When unicast transport is used over N6mb/Nmb9, at 3a the MB-SMF can newly provide the N6mb/Nmb9 tunnel address that was used prior to the MB-UPF restart and may instruct the MB-UPF to allocate this address, if possible. At 3b, the MB-UPF may provide back a different address only if previous address cannot be reused, such as in the case of a partial restart. If a different address is allocated, the MB-SMF can proceeds as in the case of an MB-UPF failure without restart.

If multicast transport is used for N6mb or N9mb, the MB-UPF may join delivery from the multicast address received in the request from the MB-SMF.

The PFCP session establishment request may include a restoration indication flag to make the MB-UPF aware that the PFCP session is to restore a PFCP session of an existing MBS session.

After an MB-UPF restart, N3mb/N19mb and N6mb/Nmb9 addresses may not be immediately reused by the MB-UPF, in order to avoid inconsistent addresses allocation throughout the network and in order to enable the restoration of PFCP sessions if the MBS sessions affected by the failure. How this is done may be implementation specific.

At the end of the procedure, MBS data delivery may be resumed towards the RAN nodes and/or UPFs, seamlessly to the rest of the system and to the NEF/AF/MBSF.

Figure 4:
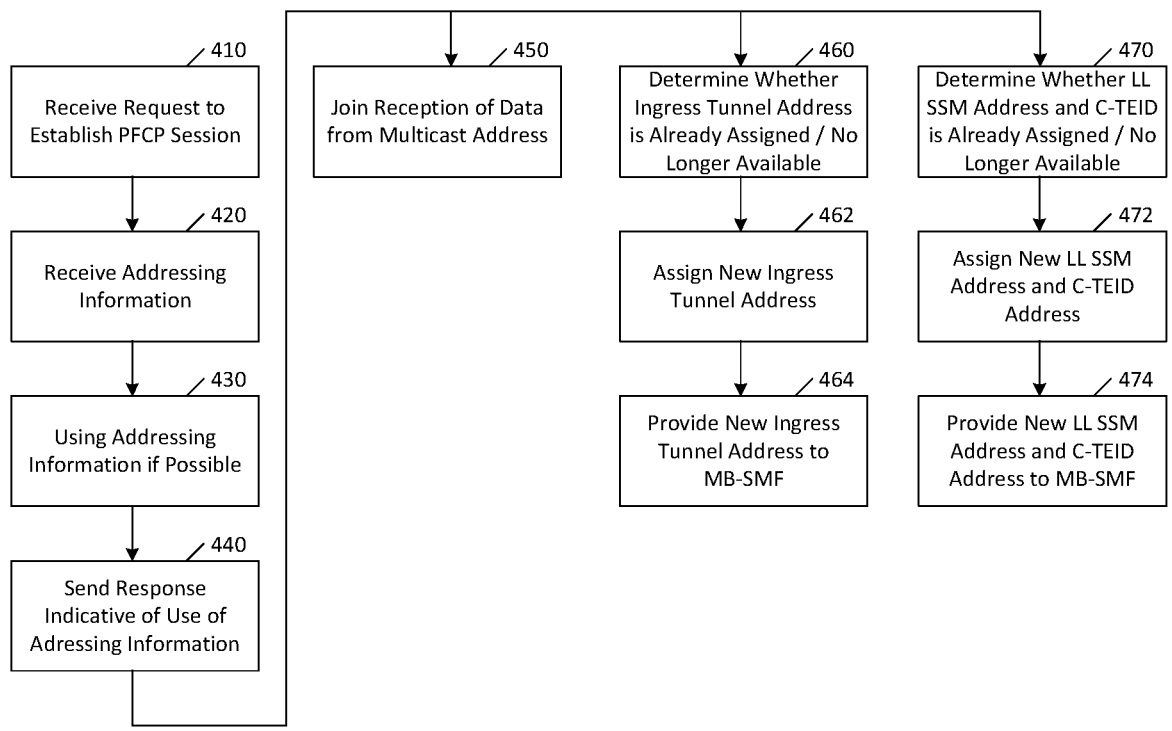
FIG. 4 illustrates a further method according to certain embodiments.

FIG. 4 illustrates a further method according to certain embodiments. As shown in FIG. 4, the method can include, at 410, receiving a request from a multicast/broadcast session management function for establishing a packet forwarding control protocol session for a multicast/broadcast session. The method can also include, at 420, receiving addressing information comprising addresses in the address range of the apparatus for the data delivery of the broadcast/multicast session. The method can further include, at 430, using this addressing information for the broadcast/multicast session if possible.

The method can further include, at 440, sending a response to the multicast/broadcast session management function indicating whether the addressing information was used.

The addressing information can be a low-layer source-specific multicast address and common general packet radio service tunneling protocol user plane tunneling endpoint identifier, that is to be used for sending data.

The addressing information can be, for each destination endpoint, a destination address and general packet radio service tunneling protocol user plane tunneling endpoint identifier, that is to be used for sending data towards that destination endpoint.

The addressing information can be a unicast ingress tunnel address, when unicast transport is to be used for receiving data.

The addressing information can include a multicast address, when multicast transport is to be used for receiving data. The method can also include, at 450, joining the reception of data from the multicast address.

The packet forwarding control protocol session establishment request can include a restoration flag configured to indicate that the establishment request is to restore a packet forwarding control protocol session of an existing multicast/broadcast service session.

At 460, the method can include determining whether the received unicast ingress tunnel address is already assigned or no longer available for assignment. At 462, the method can include assigning a new unicast ingress tunnel address if the determination is positive, namely when it is determined that the received unicast ingress tunnel address is now unusable for any reason, such as that the received unicast ingress tunnel address is already assigned or no longer available for assignment. The method can further include, at 464, providing the new unicast ingress tunnel address to the multicast/broadcast session management function if the determination is positive, for example any time that the assignment of a new unicast ingress tunnel address is performed at 462.

The method can also include, at 470, determining whether the received low-layer source-specific multicast address and common general packet radio service tunneling protocol user plane tunneling endpoint identifier are already assigned or no longer available for assignment. The method can also include, at 472, assigning a new low-layer source-specific multicast address and common general packet radio service tunneling protocol user plane tunneling endpoint identifier if the determination is positive. The method can further include, at 474, providing the new low-layer source-specific multicast address and common general packet radio service tunneling protocol user plane tunneling endpoint identifier to the multicast/broadcast session management function if the determination is positive.

Various modifications to the illustrated flow or different ways of illustrating the method of FIG. 4 are also possible. For example, the procedure at 430 can be combined with the procedures at 460 and 470. For example, a device implementing the illustrated method may check whether the provided LL SSM, ingress tunnel address, or both are already assigned o, no longer available, or otherwise unusable. If not, namely if they are usable, then addresses can be used and the response at 440 can so indicate. On the other hand, if there is any reason that the address(es) or other identifier(s) cannot be used, the device implementing the method may assign new addresses or other identifiers and may provide new addresses in the response at 440.

FIG. 4 is provided as one example embodiment of a method or process. However, certain embodiments are not limited to this example, and further examples are possible as discussed elsewhere herein.

Figure 5:
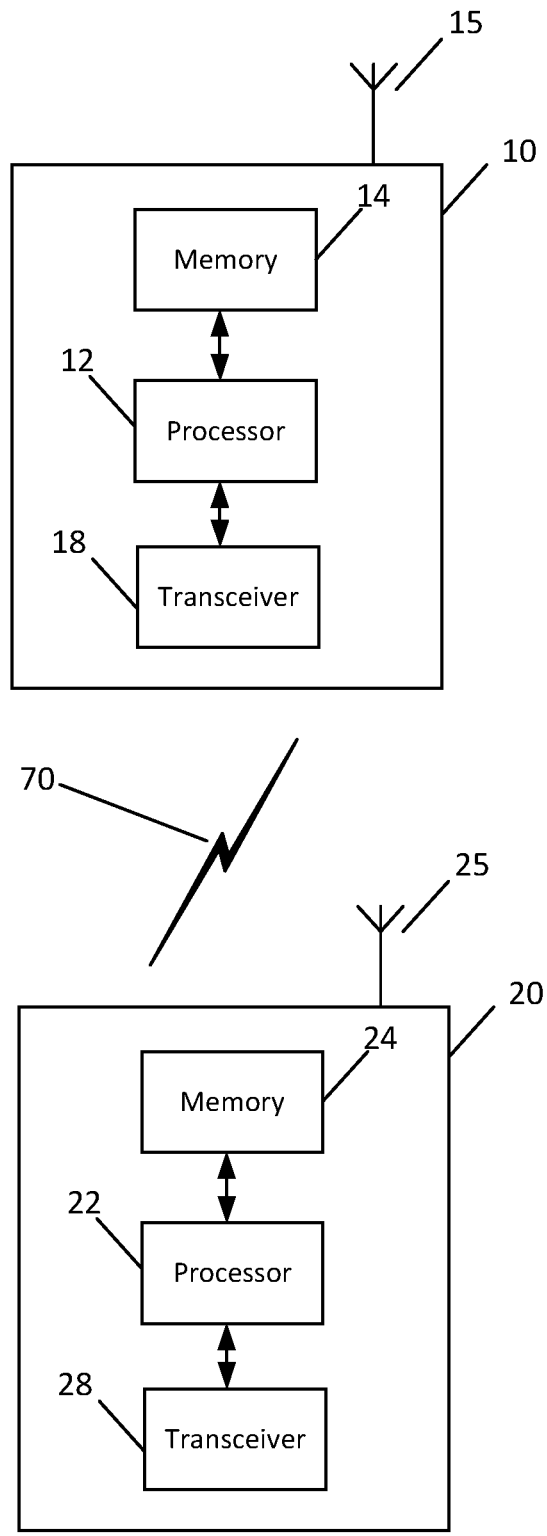
FIG. 5 illustrates an example block diagram of a system, according to an embodiment.

FIG. 5 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 5.

As illustrated in the example of FIG. 5, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 5, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RANI), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 2 and 3, or any other method described herein. In some embodiments, as discussed herein, apparatus 10 may be configured to perform a procedure relating to providing restoration of multicast/broadcast service upon multicast/broadcast failure with restart, for example.

FIG. 5 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5.

As illustrated in the example of FIG. 5, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RANI), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 2 and 3, or any other method described herein. For example, in an embodiment, apparatus 20 may be controlled to perform a process relating to providing restoration of multicast/broadcast service upon multicast/broadcast failure with restart, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, certain embodiments may permit MBS data delivery may be resumed towards the RAN nodes and/or UPFs, seamlessly to the rest of the system and to the NEF/AF/MBSF.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. An apparatus, comprising:
   at least one processor; and
   at least one memory comprising computer program instructions, which, when executed by
   the at least one processor, cause the apparatus at least to perform:
   detecting a restart of a multicast/broadcast user plane function that was supporting a packet forwarding control protocol session for a multicast/broadcast session; and
   re-creating, based on the detecting, a packet forwarding control protocol session for the multicast/broadcast session, the re-creating comprising:
      providing addressing information, used prior to the restart of the multicast/broadcast user plane function for the delivery of data of the multicast/broadcast session to the multicast/broadcast user plane function and instructing the multicast/broadcast user plane function to use the addressing information for the multicast/broadcast session, wherein the addressing information is provided by the multicast/broadcast session before the restart of the multicast/broadcast user plane function.

2. The apparatus of claim 1, wherein the addressing information comprises a low-layer source-specific multicast address and common general packet radio service tunneling protocol user plane tunneling endpoint identifier, that were provided by the multicast/broadcast session before the restart of the multicast/broadcast user plane function, when multicast transport is to be used by the multicast/broadcast user plane function for sending the data.

3. The apparatus of claim 1, wherein the addressing information comprises for each respective destination endpoint, a destination address and general packet radio service tunneling protocol user plane tunneling endpoint identifier, when unicast transport is to be used by the multicast/broadcast user plane function for sending the data towards that destination endpoint.

4. The apparatus of claim 1, wherein the addressing information comprises a unicast ingress tunnel address, that was provided by the multicast/broadcast session before the restart of the multicast/broadcast user plane function, when unicast transport is to be used by the multicast/broadcast user plane function for receiving the data.

5. The apparatus of claim 1, wherein the addressing information comprises a multicast address, when multicast transport is to be used by the multicast/broadcast user plane function for receiving the data.

6. The apparatus of claim 1, wherein the providing the addressing information and the instructing the multicast/broadcast user plane function comprises sending the addressing information and instruction in a packet forwarding control protocol session establishment request.

7. The apparatus of claim 6, wherein the packet forwarding control protocol session establishment request comprises a restoration flag configured to indicate that the packet forwarding control protocol session establishment request is to restore a packet forwarding control protocol session of an existing multicast/broadcast service session.

8. An apparatus, comprising:
   at least one processor; and
   at least one memory comprising computer program instructions, which, when executed by the at least one processor, cause the apparatus at least to perform:
   restarting a multicast/broadcast user plane function of the apparatus; and
   receiving a request from a multicast/broadcast session management function for establishing a packet forwarding control protocol session for a multicast/broadcast session, the receiving comprising:
receiving addressing information comprising addresses in an address range of the apparatus for delivery of data of the broadcast/multicast session, wherein the addressing information was used prior to the restarting of the multicast/broadcast user plane function and is received before the restarting of the multicast/broadcast user plane function; and
using the addressing information for the broadcast/multicast session.

9. The apparatus of claim 8, wherein the computer program instructions, when executed by the at least one processor, cause the apparatus to perform:
sending a response to the multicast/broadcast session management function indicating whether the addressing information was used.

10. The apparatus of claim 8, wherein the addressing information comprises a unicast ingress tunnel address, when unicast transport is to be used for receiving the data.

11. The apparatus of claim 10, wherein the computer program instructions, when executed by the at least one processor, cause the apparatus at least to perform:
determining whether the unicast ingress tunnel address is already assigned or no longer available for assignment;
assigning a new unicast ingress tunnel address based on determining that the unicast ingress tunnel address is already assigned or no longer available for assignment; and
providing the new unicast ingress tunnel address to the multicast/broadcast session management function.

12. The apparatus of claim 8, wherein the addressing information comprises a multicast address, when multicast transport is to be used for receiving the data.

13. The apparatus of claim 12, wherein the computer program instructions, when executed by the at least one processor, cause the apparatus to perform:
joining the reception of the data from the multicast address.

14. The apparatus of claims 8, wherein the request comprises a packet forwarding control protocol session establishment request that includes a restoration flag configured to indicate that the packet forwarding control protocol session establishment request is to restore a packet forwarding control protocol session of an existing multicast/broadcast service session.

15. The apparatus of claim 8, wherein the addressing information comprises a low-layer source-specific multicast address and common general packet radio service tunneling protocol user plane tunneling endpoint identifier, that were provided by the multicast/broadcast session before the restart of the multicast/broadcast user plane function, when multicast transport is to be used by the multicast/broadcast user plane function for sending the data.

16. The apparatus of claim 15, wherein the computer program instructions, when executed by the at least one processor, cause the apparatus at least to perform:
determining whether the low-layer source-specific multicast address and common general packet radio service tunneling protocol user plane tunneling endpoint identifier are already assigned or no longer available for assignment;
assigning a new low-layer source-specific multicast address and common general packet radio service tunneling protocol user plane tunneling endpoint identifier based on determining that the low-layer source-specific multicast address and common general packet radio service tunneling protocol user plane tunneling endpoint identifier are already assigned or no longer available for assignment; and
providing the new low-layer source-specific multicast address and common general packet radio service tunneling protocol user plane tunneling endpoint identifier to the multicast/broadcast session management function.

17. A method, comprising:
detecting a restart of a multicast/broadcast user plane function that was supporting a packet forwarding control protocol session for a multicast/broadcast session; and
re-creating, based on the detecting, a packet forwarding control protocol session for the multicast/broadcast session the re-creating comprising:
providing addressing information, used prior to the restart of the multicast/broadcast user plane function, for delivery of data of the multicast/broadcast session to the multicast/broadcast user plane function and instructing the multicast/broadcast user plane function to use the addressing information for the broadcast/multicast session, wherein the addressing information is provided by the multicast/broadcast session before the restart of the multicast/broadcast user plane function.

18. The method of claim 17, wherein the addressing information comprises a low-layer source-specific multicast address and common general packet radio service tunneling protocol user plane tunneling endpoint identifier, that were provided by the multicast/broadcast session before the restart of the multicast/broadcast user plane function, when multicast transport is to be used by the multicast/broadcast user plane function for sending the data.

* * * * *